(12) United States Patent
Ludwig et al.

(10) Patent No.: US 7,166,228 B2
(45) Date of Patent: Jan. 23, 2007

(54) METHOD OF TREATING A SUBSURFACE FORMATION WITH FERROUS IRON TO REDUCE CONTAMINANTS TO HARMLESS SPECIES

(75) Inventors: Ralph D. Ludwig, Norman, OK (US); Chunming Su, Ada, OK (US)

(73) Assignee: U.S. Environmental Protection Agency, Washington, DC (US)

( * ) Notice: Subject to any disclaimer, the term of this patent is extended or adjusted under 35 U.S.C. 154(b) by 61 days.

(21) Appl. No.: 10/963,607

(22) Filed: Oct. 14, 2004

(65) Prior Publication Data

US 2005/0082233 A1    Apr. 21, 2005

Related U.S. Application Data

(60) Provisional application No. 60/511,091, filed on Oct. 15, 2003.

(51) Int. Cl.
*C02F 1/70* (2006.01)
(52) U.S. Cl. ............ 210/719; 210/722; 210/747; 210/757; 210/913; 405/128.5; 405/129.25
(58) Field of Classification Search ........ 210/747, 210/757, 719, 720, 721, 722, 912, 913, 696; 405/128.45, 128.5, 128.7, 128.75, 129.2, 405/129.25
See application file for complete search history.

(56) References Cited

U.S. PATENT DOCUMENTS

| | | | | | |
|---|---|---|---|---|---|
| 4,260,491 | A | * | 4/1981 | Cassidy et al. | 210/913 |
| 5,122,279 | A | * | 6/1992 | Guess | 210/757 |
| 5,130,051 | A | * | 7/1992 | Falk | 210/749 |
| 5,380,441 | A | * | 1/1995 | Thornton | 210/913 |
| 5,397,478 | A | * | 3/1995 | Pal et al. | 210/757 |
| 5,505,857 | A | * | 4/1996 | Misra et al. | 210/912 |
| 5,951,457 | A | * | 9/1999 | James | 210/747 |
| 2003/0185630 | A1 | * | 10/2003 | Price et al. | 405/129.25 |

\* cited by examiner

*Primary Examiner*—Christopher Upton
(74) *Attorney, Agent, or Firm*—Bacon & Thomas, PLLC; George A. Loud, Esq.

(57) ABSTRACT

A method for treating a subsurface formation with a ferrous compound, to reduce a contaminant therein, involves introducing into the subsurface formation a ferrous compound in combination with sodium hydrosulfite in an amount sufficient to substantially prevent precipitation, during the introducing, of a major portion of the ferrous compound. The method was found to be useful in the reduction of hexavalent chromium to trivalent chromium at a Superfund site.

12 Claims, No Drawings

METHOD OF TREATING A SUBSURFACE FORMATION WITH FERROUS IRON TO REDUCE CONTAMINANTS TO HARMLESS SPECIES

CROSS-REFERENCE TO RELATED APPLICATION

This application claims, under 35 USC 119(e), priority of U.S. Provisional Application No. 60/511,091 filed Oct. 15, 2003.

BACKGROUND OF THE INVENTION

1. Field of the Invention

The present invention relates to the introduction into a subsurface formation of a ferrous compound (understood herein to include any compound or complex containing one or more ferrous ions), as a reductant, to reduce a contaminant contained in the subsurface formation to a harmless species. In particular, the present invention is applicable to the treatment of subsurface formations containing hexavalent chromium and other contaminants, to convert the hexavalent chromium to trivalent chromium and the other contaminants to harmless forms.

2. Related Art

One example of hexavalent chromium contamination is at the Macalloy Corporation Superfund site in North Charleston, S.C. This is a former ferrochrome production facility where a large hexavalent chromium source area and several large dissolved phase hexavalent chromium plumes are present.

Methods for treating subsurface formations with reductants include processes forming zerovalent iron (iron fillings) based, permeable reactive barriers and in situ injection processes involving various chemical reductants (e.g., sodium hydrosulfite, also referred to as sodium dithionite) only. Zerovalent iron based reactive barriers are effective (at least in the short term) but are expensive to install and allow little flexibility with respect to installation depth and location. Zerovalent iron systems are very expensive to install at depths of greater than 25 ft. In addition, zerovalent iron based reactive barriers are not easily modified once installed. Chemical reductant technology involving, for example, injection of sodium hydrosulfite only converts existing iron (if present) in the aquifer to ferrous iron forms and thereby creates a redox zone. The success of injecting hydrosulfite only is very much dependent on the presence of sufficient reducible iron in the subsurface and the treatment longevity of injection of hydrosulfite only is limited by the amount of reducible iron present in the aquifer. In addition, normally a pH buffer must be added to the hydrosulfite solution to ensure that the hydrosulfite effectively reduces any reducible iron that might be present.

It was initially assumed that sodium dithionite would likely prove to be the best reductant for use at the site based on its successful use at other Cr(VI) impacted sites. However, laboratory study indicated that sodium dithionite had little effect on treatment of the Cr(VI) in the lake fill sediments at the Macalloy Corporation Superfund site.

Ferrous sulfate and ferrous chloride, however, were observed to very effectively treat Cr(VI) as evidenced by the inability to detect Cr(VI) in water and phosphate solution extracts from fill sediments following treatment. The addition of ferrous iron salts likely serves to provide a direct source of available (reduced) iron to promote conversion of Cr(VI) to the trivalent form. Although effective in the laboratory, a major concern with the use of ferrous salts such as ferrous sulfate or ferrous chloride in the field, relative to a reductant such as sodium dithionite, is the tendency for ferrous iron to rapidly precipitate out of solution during injection. Rapid precipitation can lead to well clogging and/or aquifer formation clogging. This poses a particular concern at the Macalloy Corporation site where the fill sediments/ground water are characterized by a high pH and a high pH buffering capacity. Such conditions would be expected to promote very rapid precipitation of iron. Observations of ferrous sulfate and ferrous chloride solutions in the laboratory showed that upon exposure to the atmosphere, ferrous iron begins to precipitate out of the solution almost immediately.

Other chemical reductants (e.g., other sulfur based reductants) are less powerful than sodium hydrosulfite and were found to be either ineffective or too costly in treating contaminants associated with the Macalloy site aquifer solids.

SUMMARY OF THE INVENTION

The present invention provides a method of treating a subsurface formation with a ferrous compound to reduce a contaminant, present in the subsurface formation or in ground water entering the surface formation, to a harmless substance. The method involves introducing into the subsurface formation a ferrous compound in combination with sodium hydrosulfite in an amount sufficient to prevent precipitation, during the introducing, of a major portion (50 molar % or more) of the ferrous compound.

In one embodiment the contaminant is hexavalent chromium and the subsurface formation is lake fill.

"Subsurface formation", as used herein is intended to include consolidated and unconsolidated soils, sand, gravel and rock, as well as underground water (ground water).

Any number of ferrous compounds can be used as the reductant in the present invention. Ferrous sulfate is preferred from the viewpoint of cost. Other suitable ferrous reductants include ferrous chloride.

In one embodiment the invention involves the mixing of ferrous sulfate and sodium hydrosulfite in a 1:1 molar ratio (e.g., 0.20 M/0.20 M) and subsequent injection of the mixture (using a centrifugal pump or equivalent) into a saturated zone source area containing dissolved and solid phase hexavalent chromium. While the molar ratio of sodium hydrosulfite to ferrous compound is preferably approximately 1:1, it is not particularly limited beyond the requirement for an amount of sodium hydrosulfite sufficient to prevent precipitation of a major portion (50 molar % or more), preferably more than 95%, of the ferrous compound during introduction into the subsurface formation to be treated, e.g., 0.5:1 to amounts greater than 1:1.

The ferrous compound and sodium hydrosulfite are introduced into the subsurface formation to be treated as an aqueous solution or solutions in any convenient concentration(s), e.g., 0.20 M.

Ferrous iron is an effective reductant that can convert toxic contaminants to less toxic or innocuous forms. An example is the conversion of hexavalent chromium by ferrous iron to form innocuous and non-toxic trivalent chromium with the general reaction as follows:

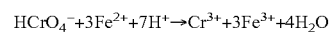
$$HCrO_4^- + 3Fe^{2+} + 7H^+ \rightarrow Cr^{3+} + 3Fe^{3+} + 4H_2O$$

This reaction proceeds rapidly (<5 minutes) and, provided the pH is greater than 4, results in the precipitation of the trivalent chromium with ferric iron to form the relatively insoluble solid solution with the general composition $Cr_xFe_{1-x}(OH_3)$.

Injection into the subsurface formation to be treated can be carried out via any well system (e.g., one or two-inch diameter PVC wells with 5–10 ft 10-slot screens) or by direct push injection methods (e.g., Geoprobe systems). Spacings of wells or injection points will be dependent on the amount of reductant injected per location, the hydraulic conductivity of the targeted aquifer formation, and the geochemistry of the aquifer formation. Once injected into the aquifer formation, the ferrous iron in the presence of the hydrosulfite disseminates itself throughout the targeted zone and reacts with dissolved phase and solid phase hexavalent chromium within the aquifer to form innocuous and non-toxic trivalent chromium. The hydrosulfite eventually degrades to sulfate ions and possible ferrous iron solid phases such as siderite may be formed, and the aquifer solids are left covered with sorbed ferrous iron. The sorbed iron and solid phase ferrous iron forms make the aquifer solids highly "reactive" and thereby impart to the aquifer formation a residual treatment capacity. That is, the treated aquifer formation acquires an ability to treat contaminated ground water subsequently entering the treated aquifer zone from upgradient sources (i.e., a redox treatment zone is formed). The length of time that the ferrous iron treated aquifer will be able to treat incoming contaminated ground water will depend on the amount of ferrous iron injected, the oxidizing capacity of the incoming ground water, and the ground water flow rate. The more ferrous iron injected, the longer the treated aquifer (redox zone) can be expected to subsequently treat incoming contaminated ground water.

The nature of the ferrous iron dissemination process is such that the hydraulic conductivity of the aquifer formation is not decreased. The ferrous iron is disseminated over a broad diffuse zone within the aquifer. Ground water flowing under natural gradient conditions eventually exits on the downgradient side of the in situ redox zone and is free of the targeted contaminants. Effective treatment of incoming ground water continues until most or all of the ferrous iron has reacted and is ultimately converted to the ferric iron form.

The advantages of the invention include its low cost and high flexibility relative to use of zerovalent iron based reactive barrier technology and its superior treatment effectiveness and reliability relative to sodium hydrosulfite and other sulfur and non-sulfur based reductants alone. In contrast, to zerovalent iron permeable reactive barriers, the method of the present invention is much cheaper, can be applied at almost any depth in almost any geological formation, and does not have the construction constraints (e.g. access constraints) that plague zero-valent iron based systems. In addition, installation of a system for practice of the method of the invention is much less intrusive than for zerovalent iron based systems where significant trench spoils are generated and large size equipment is generally required. The advantage of the present invention over the use of sulfur and non-sulfur reductants alone is that the present invention delivers and directly uses ferrous iron as the active reagent and there is thus virtually no limit to how much iron can be injected. A large reserve of ferrous iron can thus be built up in the aquifer to allow for a long-term redox treatment zone to be developed.

Thus, the present invention has the ability to effectively inject ferrous iron over a broad area within the subsurface and the ability to inject the ferrous iron without adversely impacting the hydraulic conductivity of the formation into which the ferrous iron is injected. The invention allows ferrous iron to be maintained in solution over a prolonged period of time in an environment where it heretofore has not been possible. Further, the ability to maintain the iron in solution allows the iron to be distributed over a significant and practical radius of influence which heretofore has not been possible.

DESCRIPTION OF THE PREFERRED EMBODIMENTS

A pilot test involving the injection of a ferrous sulfate/sodium dithionite reductant into the subsurface to treat solid phase and dissolved hexavalent chromium (Cr(VI)) was conducted at the Macalloy Corporation site in North Charleston, S.C. The pilot test was conducted in the lake fill source zone area of the site where some of the highest concentrations of dissolved-phase Cr(VI) have been observed.

The lake fill presented a significant continuing source of Cr(VI) contamination to ground water at the site and was found both above and below the water table over a large area of the site. The overall objective of the reductant treatment was to irreversibly convert both solid phase and dissolved phase Cr(VI) in the source fill area to the less toxic and less mobile trivalent chromium Cr(III) form. Conversion involves reduction of hexavalent chromium by ferrous iron to trivalent chromium and the subsequent precipitation of an amorphous $Cr_xFe_{1-x}(OH)_3$ solid. In general, three moles of ferrous iron are required to convert and precipitate each mole of Cr.

Laboratory Tests

Laboratory bench-scale batch studies were conducted as part of the investigation to determine the most appropriate reagent for injection into the subsurface. Because the pH of the lake fill ground water was observed to be very high (>11.0) in the first pilot test area, a microbiologically based treatment process involving organic substrate addition was not considered feasible. It is highly unlikely that a microbiological population capable of utilizing organic substrates to reduce Cr(VI) could flourish in such a high pH environment. The laboratory study thus focused on the use of chemical reductants. Reductants considered included sodium dithionite, ferrous sulfate, ferrous chloride, hydroxylamine sulfate, zero-valent iron, and citric acid (see Table 1).

It was initially assumed that sodium dithionite would likely prove to be the best reductant for use at the site based on its successful use at other Cr(VI) impacted sites. However, the laboratory study indicated that sodium dithionite had little affect on treatment of the Cr(VI) in the lake fill sediments. Ferrous sulfate and ferrous chloride, however, were observed to very effectively treat Cr(VI) as evidenced by the inability to detect Cr(VI) in water and phosphate solution extracts from the fill sediments following treatment. The addition of ferrous iron salts likely serves to provide a direct source of available (reduced) iron to promote conversion of Cr(VI) to the trivalent form.

Although effective in the laboratory, a major concern with the use of ferrous salts such as ferrous sulfate or ferrous chloride in the field, relative to a reductant such as sodium dithionite, is the tendency for ferrous iron to rapidly precipitate out of solution during injection. Rapid precipitation can lead to well clogging and/or aquifer formation clogging. This posed a particular concern at the Macalloy Corporation site where the fill sediments/ground water are characterized by a high pH and a high pH buffering capacity. Such conditions could be expected to promote very rapid precipitation of iron. Observations of ferrous sulfate and ferrous chloride solutions in the laboratory showed that upon exposure to the atmosphere, ferrous iron begins to precipitate out of the solution almost immediately. However, when combined with sodium dithionite, no visually observable precipitation of ferrous iron occurred over a period of at least five days. These observations suggest that sodium dithionite markedly increases the stability of ferrous iron in solution. Thus, in order to limit potential well and aquifer formation clogging problems and maximize the travel distance of the ferrous iron within the aquifer, a combined sodium dithionite/ferrous sulfate solution was ultimately selected for use in the pilot study.

ft and 10 ft from the injection well. All monitoring and injection well screens were 10-slot. Following installation, formation sediments were allowed to collapse around each well. Bentonite pellets were placed in the upper few feet of annular space to allow for formation of a surface seal around each well.

Reductant

The reductant used in the second pilot study was a 0.2 M ferrous sulfate/0.2 M sodium dithionite solution with a pH of approximately 4.0. Approximately 4800 gallons of the reductant solution were formulated and delivered to the site. The reductant was injected into the subsurface from a tank

TABLE 1

Reactions of two extractants and 23 reductants with lake fill sediment (LEISB 005 10') for 24 h at 100 rpm at 23° C.

| Reagent | Final pH | Eh (mV) | Total Cr (mg L$^{-1}$) |
|---|---|---|---|
| deionized water (pH 5.7) | 9.68 ± 0.00 | 170 ± 2 | 7.4 ± 0.0 |
| 5 mM KH$_2$PO$_4$/5 mM K$_2$HPO$_4$ (pH 7.0) | 9.91 ± 0.00 | 331 ± 10 | 8.0 ± 0.0 |
| 0.025 M Na$_2$S$_2$O$_4$ | 9.65 ± 0.01 | 164 ± 4 | 10.3 ± 0.1 |
| 0.05 M Na$_2$S$_2$O$_4$ | 9.72 ± 0.00 | 132 ± 10 | 11.8 ± 0.1 |
| 0.025 M FeCl$_2$ | 9.16 ± 0.01 | 113 ± 26 | <0.003 |
| 0.025 M FeSO$_4$ | 9.40 ± 0.00 | 123 ± 3 | <0.003 |
| 0.05 M FeCl$_2$ | 9.12 ± 0.04 | −112 ± 22 | <0.003 |
| 0.05 M FeSO$_4$ | 9.00 ± 0.02 | −203 ± 21 | <0.003 |
| 0.05 M citric acid | 9.10 ± 0.01 | 363 ± 3 | 26.2 ± 0.2 |
| 0.05 M hydroxylamine sulfate | 9.26 ± 0.02 | −150 ± 1 | 0.11 ± 0.01 |
| 1.0 g Peerless iron | 9.82 ± 0.00 | 254 ± 2 | 2.90 ± 0.00 |
| 0.025 M Na$_2$S$_2$O$_4$ + 0.05 M KHCO$_3$ | 9.86 ± 0.01 | 203 ± 5 | 12.2 ± 0.1 |
| 0.025 M Na$_2$S$_2$O$_4$ + 0.05 M K$_2$CO$_3$ | 10.08 ± 0.00 | 28 ± 2 | 12.1 ± 0.1 |
| 0.05 M Na$_2$S$_2$O$_4$ + 0.10 M KHCO$_3$ | 9.83 ± 0.01 | 189 ± 3 | 14.5 ± 0.1 |
| 0.05 M Na$_2$S$_2$O$_4$ + 0.10 M K$_2$CO$_3$ | 10.18 ± 0.01 | 6 ± 5 | 12.6 ± 0.1 |
| 0.025 M Na$_2$S$_2$O$_4$ + 0.025 M FeCl$_2$ | 9.09 ± 0.01 | −376 ± 4 | <0.003 |
| 0.05 M Na$_2$S$_2$O$_4$ + 0.05 M FeCl$_2$ | 9.17 ± 0.00 | −213 ± 8 | <0.003 |
| 0.01 M Na$_2$S$_2$O$_4$ + 0.01 M FeSO$_4$ | 9.53 ± 0.01 | 191 ± 3 | 0.41 ± 0.17 |
| 0.025 M Na$_2$S$_2$O$_4$ + 0.025 M FeSO$_4$ | 9.39 ± 0.01 | −144 ± 7 | <0.003 |
| 0.05 M Na$_2$S$_2$O$_4$ + 0.01 M FeSO$_4$ | 9.50 ± 0.01 | 147 ± 7 | 0.01 ± 0.00 |
| 0.05 M Na$_2$S$_2$O$_4$ + 0.05 M FeSO$_4$ | 8.62 ± 0.01 | −523 ± 1 | <0.003 |
| 0.05 M citric acid + 0.05 M FeCl$_2$ | 8.05 ± 0.01 | −106 ± 2 | 22.5 ± 0.9 |
| 0.05 M citric acid + 0.05 M FeSO$_4$ | 8.09 ± 0.00 | −115 ± 4 | 15.6 ± 1.7 |
| 0.05 M Na$_2$S$_2$O$_4$ + 0.05 M citric acid + 0.05 M FeCl$_2$ | 8.11 ± 0.01 | −152 ± 4 | 26.3 ± 0.1 |
| 0.05 M Na$_2$S$_2$O$_4$ + 0.05 M citric acid + 0.05 M FeSO$_4$ | 8.08 ± 0.01 | −151 ± 1 | 25.1 ± 0.3 |

Total Cr concentrations were determined by ICP.

Cr(VI) is generally found in ground water as chromate ($CrO_4^{2-}$) and/or dichromate ($Cr_2O_7^{2-}$). Introduction of the reductant solution would be expected to bring about the general reaction involving reduction of chromate in the presence of ferrous iron as follows:

$$HCrO_4^- + 3Fe^{2+} + 7H^+ \rightarrow Cr^{3+} + 3Fe^{3+} + 4H_2O$$

This reaction proceeds rapidly (<5 minutes) and, provided the pH is greater than 4, results in the precipitation of the Cr(III) with ferric iron to form the solid solution with the general composition, $Cr_xFe_{1-x}(OH)_3$.

Test Set-Up

The test set-up for the second pilot study consisted of a single injection well and a series of monitoring wells installed radially out in one direction. All wells were installed with a track mounted Geoprobe 6600 unit. The injection well consisted of a 2-inch diameter PVC well screened from 7.5 to 15 feet below ground surface (bgs). Monitoring wells consisted of pairs of 0.75-inch ID PVC wells screened from 6–11 ft bgs and 11–16 ft bgs. Monitoring pairs were completed at distances of 2.5 ft, 5.0 ft, 7.5 truck using a 0.5 horsepower centrifugal pump. Flow was controlled using a two-inch diameter ball valve.

Baseline Sampling

Prior to injection, baseline monitoring of the injection well and monitoring wells was conducted in the test area to establish pre-test conditions. This involved determining initial Cr(VI) concentrations, pH, conductivity, temperature, dissolved oxygen, redox potential, ferrous iron, sulfide, cations, anions, alkalinity, dissolved organic carbon (DOC) and total organic carbon (TOC), and dissolved inorganic carbon (DIC) and total inorganic carbon (TIC). Redox potential, pH, conductivity, temperature, and dissolved oxygen were measured in-line during sample collection using a Hydrolab or Horiba U-22 multi-probe system fitted with a flow-through cell. Cr(VI), ferrous iron, and sulfide analyses were made in the field on 0.45 μm filtered samples using a Hach field kit (including portable Hach DREL2010 spectrophotometer). Turbidity was measured in the field using a portable turbidimeter. Samples to be analyzed for DOC/DIC and TOC/TIC were collected unfiltered in 40 ml glass VOA vials (one vial for DOC/TOC and one vial for DIC/TIC).

Samples to be analyzed for alkalinity were collected in 250 mL polyethylene bottles and capped. Samples to be analyzed for cations were filtered in-line (0.45 μm) into 125 mL polyethylene bottles and acidified to a pH of less than 2 using nitric acid. Samples to be analyzed for anions were filtered in-line (0.45 μm) into 125 mL polyethylene bottles but not acidified. Prior to sampling, each monitoring well was purged of approximately three well volumes.

Reductant Injection

Following baseline sampling, 4800 gallons of the reductant were injected into the single injection well. The reductant was injected at an average flow rate of 16 gpm at an average injection pressure of 10 psi. Injection time thus totaled approximately five hours.

Results

Following injection of the 4800 gallons of reductant into the injection well, ground water samples were collected from selected monitoring wells after 2, 6, and 34 days. Table 2 presents a summary of pre-injection and post-injection geochemical parameter measurements in the pilot test area in monitoring wells screened from 11–16 ft bgs. Observed changes with respect to key geochemical parameters in ground water after treatment are discussed below.

Cr(VI)

Pre-injection Cr(VI) concentrations measured in the monitoring wells in the pilot test area ranged from 3.4 to 6.1 mg/L (see Table 1). These concentrations were lower than those observed in the first pilot test area and indicated that spatial variability with respect to Cr(VI) concentrations clearly exists within the lake fill area over short distances. Cr(VI) analyses could not be conducted on post-treatment samples due to interferences caused by sodium dithionite using the Hach field test kit. ICP-based total chromium measurements were thus used in place of Cr(VI) measurements on post-treated samples. Sampling results from monitoring wells 2, 6, and 34 days following injection indicated effective treatment of Cr(VI) within the aquifer out to a distance of at least 7.5 ft and partial treatment out to a distance of at least 10 ft. The post-treatment total Cr concentrations of 0.076 mg/L and 1.777 mg/L, respectively measured at 7.5 ft and 10 ft from the injection well after 34 days, were lower than the concentrations detected at these locations 6 days after injection. This suggests that the treatment radius may expand to some extent following injection.

The 34 day concentration of 1.777 mg/L measured at 10 ft from the injection well represents an approximate 50% decrease in the Cr(VI) concentration relative to the pre-treatment concentration of 3.466 mg/L measured at this location. This suggests that 20 foot spacings for injection wells may suffice to achieve treatment of Cr(VI) in the source area, assuming conditions are similar throughout the source area.

Total Chromium

Total chromium concentrations measured at well locations prior to reductant injection in the pilot test area were observed to be roughly equal to the hexavalent chromium concentrations measured with the field Hach kit. It is thus assumed that all chromium in the ground water prior to treatment was in the hexavalent form. It is also assumed that following treatment, total chromium concentrations are similarly equal to hexavalent chromium concentrations although it is conceivable that some of the total chromium remaining in solution may be in a complexed trivalent form. Since evaluation of the presence/absence of complexes was beyond the scope of the pilot study, it was assumed that measured total chromium concentrations were the equivalent of hexavalent chromium concentrations.

pH

The pre-treatment pH values in monitoring wells in the second pilot test area were approximately 9.8 and were thus lower than the average pre-treatment pH of 11.5 observed in the first pilot study area. As observed in the first pilot study, pH values in monitoring wells within the treated zone of the second pilot study dropped following injection (see Table 2). Greater drops in pH generally coincided with greater treatment effectiveness.

Oxidation-Reduction Potential

Oxidation-reduction potential (ORP) readings (uncorrected to the standard hydrogen electrode) prior to injection ranged between 95 and 242 mV in the pilot test area. ORP values, as in the case of the first pilot study were observed to markedly drop following injection of the reductant (see Table 2). As in the case of pH, greater decreases in ORP readings coincided with greater treatment effectiveness.

Ferrous Iron

Ferrous iron prior to injection was not detected in any ground water samples collected. Two days following injection, ferrous iron was detected as high as 92 mg/L at a distance of 2.5 ft from the injection well. (This compares to a high of 6.9 mg/L that was detected in monitoring wells following injection in the first pilot test area.) At a distance of 10 ft from the injection well, a ferrous iron concentration of 0.11 mg/L was detected after 48 hours. After a period of 34 days, ferrous iron was still detected at a distance of 1 0ft, at a concentration of 0.05 mg/L. As would be expected, ferrous iron concentrations gradually decreased with time in all monitoring wells. The sustained presence of the ferrous iron in the ground water, however, suggests that ample opportunity likely exists for the ferrous iron to react with the hexavalent chromium associated with the solid matrix.

Dissolved Oxygen

As observed in the first pilot test area, dissolved oxygen (DO) concentrations in the second pilot test area were less than 1 mg/L in all monitoring wells both in pre-treatment samples and post-treatment samples.

Treatment Permanency

Laboratory batch tests conducted on treated lake fill sediments following the first pilot study indicated, that if the fill sediments are sufficiently dosed with the reductant, the treatment appears to be complete and irreversible. This is based on an inability to detect Cr(VI) in 24-hour, 30-day, and 60-day aqueous and phosphate solution extracts from treated sediment samples obtained from cores collected near the injection well following injection. Extracts were obtained by mixing 2.5 g of dry weight equivalent sediment sub-samples with 25 mL water or phosphate solution. In contrast to the reductant treated samples which showed no detectable levels of Cr(VI), aqueous and phosphate solution extracts obtained from pre-treatment sediment samples showed Cr(VI) concentrations in the range of 5 to 11 mg/L after 24 hours.

Treatment permanency is also supported by the 34-day field data from the second pilot study which indicated that total chromium concentrations in treated areas remained low and, if anything, dropped over time. Data collected 71 days after treatment from monitoring wells located 7.5 ft and 10 ft from the injection point showed total chromium concentrations slightly below those observed after 34 days. If permanent treatment were not achieved, presumably hexavalent chromium concentrations would have rapidly rebounded in these monitoring wells following injection.

Residual Treatment Capacity

Laboratory batch tests conducted on field core subsamples following the first pilot test also indicated that if the lake fill sediments are sufficiently dosed with the reductant, the treated fill sediments will acquire a residual treatment capacity for treating dissolved phase Cr(VI). For example, a core sample collected following injection from a depth of 15–16 bgs at a distance of 1.5 ft from the injection well indicated that when immersed in a 50 mg/L solution of Cr(VI) at a 10:1 water to solids ratio (w/w), all Cr(VI) was removed from solution and presumably converted to Cr(III).

The residual treatment capacity imparted to sediments following treatment will likely vary as a function of the strength of the reductant added and the ability to uniformly distribute the reductant in the subsurface. Due to compositional variations within the fill, localized zones within the lake fill sediment may require heavier doses of treatment relative to other zones to achieve similar residual treatment capacities.

The ability to impart a residual treatment capacity to sediments has important implications for full-scale treatment design at the site. It suggests that full access to and treatment of all lake fill sediments during injection may not necessarily be required for successful overall treatment at the site. The more effectively accessed and treated zones could compensate for the less effectively accessed and treated zones by treating any dissolved phase Cr(VI) that might potentially be released by the less effectively treated zones. It is anticipated that non-uniform distribution of the reductant will occur in the subsurface under any injection scenario due to the significant heterogeneities present within the lake fill sediments.

Discussion and Conclusions

The results of the second pilot test conducted in the lake fill source area have demonstrated that the treatment radius of influence within the source area can be expanded by increasing the volume and concentration of reductant injected into the subsurface. By tripling the volume and concentration of reductant injected relative to the first pilot study, an approximately three-fold increase in the radius of influence and approximately nine-fold increase in volume of saturated soil treated was achieved. Treatment to less than 100 ppb total chromium was achieved out to a distance of 7.5 ft and 50% treatment was achieved out to a distance of 10 ft. The ability to achieve a 50% reduction in the concentration of total chromium out to a distance of 10 ft from the injection point suggests that injection well spacings of 20 ft might be feasible within the lake fill area. This assumes that conditions within the lake fill area outside the pilot test area are similar to those within the pilot test area. Assuming the lake fill area is approximately 4 acres in size, this would translate to approximately 440 injection wells that would need to be installed in the lake fill area in order to achieve treatment. If 15-ft spacings were to be used, then approximately 780 injection wells would be required in the lake fill area.

Effective chromium treatment within a target zone coincides with a significant decrease in redox potential and pH. Some constituent concentrations increase and others decrease following injection of the reductant. Constituent concentrations observed to increase include calcium, magnesium, sodium, manganese, barium, strontium, and sulfate. The results of the pilot test did not provide any evidence of the increased mobility of any constituents of potential concern within the lake fill source area. Constituents observed to decrease in concentration (in addition to hexavalent chromium) included potassium, boron, antimony, and selenium. Also observed to decrease in concentration were total and dissolved inorganic carbon.

The complete displacement of a saturated zone pore volume with the chemical reductant solution will likely be a requirement for effective treatment of the solid phase matrix to be achieved. Higher strength solutions clearly provide better assurance of complete treatment in the highly heterogeneous lake fill area and will impart greater residual treatment capacity to the aquifer solids.

Other hexavalent chromium source areas at the Macalloy site can also potentially be treated with the reductant chemical used in the pilot study. However, any additional source areas will need to be identified and delineated. Dissolved-phase hexavalent plumes outside any source areas at the site would likely not warrant the aggressive treatment proposed for the lake fill area and other potential source areas. An alternative for addressing the dissolved-phase plumes might be employment of the ferrous sulfate/sodium dithionite chemical reductant treatment used in the lake fill area to create redox zones in the path of the dissolved plumes. The redox zones would essentially serve as permeable reactive barriers. The advantage of this approach would be that the entire plume would not need to be treated and significant cost-savings may be realized. A disadvantage is that because the entire plume would not be treated, time must be allowed for all dissolved-phase hexavalent chromium to reach the reactive zone.

TABLE 2

Selected parameter measurements in monitoring wells before and after injection in pilot test area.

| | Cr(VI) mg/L | Total Cr mg/L | pH | S.C. mS/cm | ORP mV | Fe(II) mg/L | D.O. mg/L | Temp. °C. |
|---|---|---|---|---|---|---|---|---|
| RM-2 (2.5 ft) | | | | | | | | |
| Pre-Treatment | 6.1 | 6.118 | 9.8 | 15.0 | 95 | <0.01 | 0.08 | 24.1 |
| 48 hrs | | 0.029 | 7.49 | 39.7 | −619 | 92.0 | 0.42 | 27.4 |
| 144 hrs | | <0.003 | 7.85 | 38.7 | −408 | 43.5 | 0.51 | 28.6 |
| 34 days | | <0.003 | 8.23 | 33.1 | −440 | >5.0 | 0.63 | 29.9 |
| RM-4 (5.0 ft) | | | | | | | | |
| Pre-Treatment | 4.6 | 5.014 | 9.8 | 16.8 | 130 | <0.01 | 0.06 | 24.1 |
| 48 hrs | | 0.011 | 7.85 | 31.0 | −556 | 29.7 | 0.52 | 24.1 |
| 144 hrs | | 0.008 | 8.03 | 30.1 | −504 | 18.5 | 0.56 | 26.0 |
| 34 days | | 0.014 | 8.28 | 23.4 | −417 | 2.79 | 0.61 | 27.4 |

TABLE 2-continued

Selected parameter measurements in monitoring wells before and after injection in pilot test area.

| | Cr(VI) mg/L | Total Cr mg/L | pH | S.C. mS/cm | ORP mV | Fe(II) mg/L | D.O. mg/L | Temp. ° C. |
|---|---|---|---|---|---|---|---|---|
| RM-6 (7.5 ft) | | | | | | | | |
| Pre-Treatment | 4.9 | 4.916 | 9.8 | 16.8 | 242 | <0.01 | 0.03 | 23.4 |
| 48 hrs | | 0.135 | 8.77 | 30.4 | −403 | 1.8 | 0.47 | 27.6 |
| 144 hrs | | 0.136 | 8.71 | 29.7 | −388 | 1.6 | 0.55 | 25.7 |
| 34 days | | 0.076 | 8.75 | 21.4 | −246 | 0.11 | 0.65 | 27.4 |
| RM-8 (10 ft) | | | | | | | | |
| Pre-Treatment | 3.4 | 3.466 | 9.8 | 20.7 | 191 | <0.01 | 0.11 | 23.0 |
| 48 hrs | | 2.241 | 8.91 | 28.2 | −212 | 0.11 | 0.55 | 24.8 |
| 144 hrs | | 2.700 | 8.97 | 25.4 | −230 | 0.06 | 0.72 | 23.6 |
| 34 days | | 1.777 | 8.91 | 20.1 | −174 | 0.05 | 0.63 | 28.6 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of treating a subsurface formation with a ferrous compound to reduce a contaminant, present in a high pH aqueous phase in the subsurface formation or in ground water entering the subsurface formation, to a harmless substance, said method comprising introducing into the subsurface formation said ferrous compound in combination with sodium hydrosulfite in an amount sufficient to prevent precipitation, during said introducing, of a major portion of said ferrous compound.

2. The method of claim 1 wherein said contaminant is hexavalent chromium.

3. The method of claim 2 wherein said subsurface formation is lake fill.

4. The method of claim 1 wherein said subsurface formation is lake fill.

5. The method of claim 1 wherein said ferrous compound is ferrous chloride or ferrous sulfate.

6. The method of claim 1 wherein said ferrous compound and said sodium hydrosulfite are introduced in an approximately 1:1 molar ratio.

7. The method of claim 1 wherein said subsurface formation is an acquifier formation.

8. The method of claim 1 wherein said subsurface formation is a structured zone formation.

9. The method of claim 1 wherein the high pH is greater than 11.

10. The method of claim 1 wherein the high pH is at least 9.8.

11. The method of claim 1 wherein the contaminant is hexavalent chromium and wherein the hexavalent chromium is reduced to trivalent chromium and precipitated as an amorphous $Cr_xFe_{1-x}(OH)_3$ solid.

12. The method of claim 1 wherein solids within the subsurface formation are covered with sorbed ferrous iron, thereby imparting the subsurface formation with a residual treatment capacity.

* * * * *